United States Patent
Huddleston

(10) Patent No.: US 12,351,102 B1
(45) Date of Patent: Jul. 8, 2025

(54) LIGHT EMITTING HANDLE

(71) Applicant: Bass Pro Intellectual Property, L.L.C., Springfield, MO (US)

(72) Inventor: Rick Huddleston, Yellville, AR (US)

(73) Assignee: Bass Pro Intellectual Property, L.L.C., Springfield, MO (US)

( * ) Notice: Subject to any disclaimer, the term of this patent is extended or adjusted under 35 U.S.C. 154(b) by 0 days.

(21) Appl. No.: 18/916,914

(22) Filed: Oct. 16, 2024

(51) Int. Cl.
| | |
|---|---|
| B60Q 1/26 | (2006.01) |
| B25G 1/00 | (2006.01) |
| B60P 3/10 | (2006.01) |
| F21V 33/00 | (2006.01) |
| G05G 1/10 | (2006.01) |

(52) U.S. Cl.
CPC ............. *B60Q 1/2661* (2013.01); *B25G 1/00* (2013.01); *B60P 3/1066* (2013.01); *F21V 33/00* (2013.01); *G05G 1/105* (2013.01)

(58) Field of Classification Search
CPC ...... B60Q 1/2661; B60Q 1/2657; B60Q 1/32; B60Q 1/305; B60P 3/1066; A45B 3/00; A45B 3/02; A45B 3/04; G05G 1/10; G05G 1/105; B25G 1/00; F21V 33/00; F21V 33/008; F21V 33/0084
USPC ......................................................... 362/485
See application file for complete search history.

(56) References Cited

U.S. PATENT DOCUMENTS

| | | | |
|---|---|---|---|
| 6,302,567 B1 * | 10/2001 | Gamble, Sr. | B60Q 1/2657 362/540 |
| 8,701,353 B2 | 4/2014 | Patel et al. | |
| 8,707,500 B2 | 4/2014 | Nanda | |
| 10,889,239 B2 * | 1/2021 | Washington | B60Q 1/0483 |
| 11,603,027 B1 * | 3/2023 | Reynolds | B60P 3/1075 |
| 2009/0323368 A1 * | 12/2009 | Campbell | B62K 21/26 362/474 |
| 2016/0090028 A1 * | 3/2016 | Krejci | B60Q 1/2657 362/485 |

OTHER PUBLICATIONS

BoatEFX, Ranger Boat Trailer Steps; https://boatefx.com/products/ranger-boat-trailer-steps-by-boatefx; Oct. 3, 2024.
Easy Step Boat Trailer Steps; https://easystepsystem.com/product/easy-step-3-0/; Oct. 3, 2024.

* cited by examiner

*Primary Examiner* — Laura K Tso
(74) *Attorney, Agent, or Firm* — Dinsmore & Shohl LLP

(57) ABSTRACT

A light emitting handle provides illumination for the area around a boat trailer. The light emitting handle can be placed on a handle tube that is attached to the boat trailer or to steps on the boat trailer. The light emitting handle includes a handle body and a battery holder within the handle body. The handle body includes light sources that emit light into the ambient area. An interior surface of the handle body and an exterior surface of the battery holder define an annulus that can receive a portion of the handle tube allowing the light emitting handle to slide onto the handle tube.

13 Claims, 4 Drawing Sheets

LIGHT EMITTING HANDLE

TECHNICAL FIELD

Embodiments of the disclosure relate generally to a light emitting handle for a boat trailer.

BACKGROUND

An accessory for boat trailers that is gaining increasing popularity is a set of trailer steps. Trailer steps typically are attached towards the front of the trailer and facilitate boarding and deboarding a boat that is mounted on the trailer. Without trailer steps, people have to resort to more challenging methods of boarding and deboarding a boat such as stepping on a portion of the boat trailer, stepping on a vehicle that is adjacent to the boat trailer, or using a free-standing ladder.

Some models of trailer steps include a handle tube. A handle tube is a generally vertically oriented handle that extends upward from the trailer steps or from the boat trailer. The handle tube provides a handle for people using the trailer steps and assists those people in maintaining their balance when boarding or deboarding the boat on the trailer.

People are often boarding or deboarding a boat on a trailer in low light conditions, such as in the early morning, evening, or night. Therefore, providing illumination in association with the trailer steps would further assist people using trailer steps on a boat trailer.

SUMMARY

In one example embodiment, the present disclosure is generally directed to a light emitting handle for use with a boat trailer. The light emitting handle may comprise a handle body having a tubular shape and a battery holder having a tubular shape. The handle body may comprise: (a) a body interior surface, (b) a body exterior surface comprising one or more light emitting sources, (c) a bottom perimeter joining the body interior surface and the body exterior surface at a bottom of the handle body, (d) a bottom opening defined by the body interior surface at the bottom of the body handle, (e) a handle body cap enclosing a top of the handle body, and (f) a power switch for providing power to the one or more light emitting sources. The battery holder may comprise: (a) a battery holder interior surface, (b) a battery holder exterior surface, (c) a battery holder endcap enclosing a bottom of the battery holder, (d) a top opening defined by the battery holder interior surface, and (e) a battery holder flange extending radially outward from the battery holder exterior surface proximate the top opening. The body interior surface and the battery holder exterior surface define an annulus for receiving a handle tube.

The foregoing example embodiment may further include one or more of the following additional features. In one embodiment, the power switch may connect a battery connector to the one or more light emitting sources. The power switch may be disposed on the handle body cap. The one or more light emitting sources comprises one or more arrays of light emitting sources disposed along a length of the body exterior surface. The one or more arrays of light emitting sources may be disposed in one or more respective recesses on the body exterior surface. The one or more light emitting sources may be light emitting diodes. The handle body and the battery holder may have a common central longitudinal axis. The handle body and the battery holder may have a circular cross-sectional shape. The handle body and the battery holder may have a square cross-sectional shape.

The foregoing embodiments are non-limiting examples and other aspects and embodiments will be described herein. The foregoing summary is provided to introduce various concepts in a simplified form that are further described below in the detailed description. This summary is not intended to identify required or essential features of the claimed subject matter nor is the summary intended to limit the scope of the claimed subject matter.

BRIEF DESCRIPTION OF THE DRAWINGS

The accompanying drawings illustrate only example embodiments of a light emitting handle for a boat trailer and therefore are not to be considered limiting of the scope of this disclosure. The principles illustrated in the example embodiments of the drawings can be applied to alternate methods and apparatus. Additionally, the elements and features shown in the drawings are not necessarily to scale, emphasis instead being placed upon clearly illustrating the principles of the example embodiments. Certain dimensions or positions may be exaggerated to help visually convey such principles. In the drawings, the same reference numerals used in different embodiments designate like or corresponding, but not necessarily identical, elements.

DETAILED DESCRIPTION OF EXAMPLE EMBODIMENTS

The example embodiments discussed herein are directed to a light emitting handle for a boat trailer. The example light emitting handles described herein provide several advantages. First, the example light emitting handles are configured to easily slide onto an existing handle tube attached to a boat trailer or the steps of a boat trailer. The example light emitting handles also can be easily removed from a handle tube for replacing the batteries or for other maintenance. The example light emitting handles enhance gripping of a handle tube to assist a person boarding or deboarding a boat on a boat trailer. The example light emitting handles also are configured so that the light sources on the handle do not interfere with gripping the handle, while also providing helpful illumination to the ambient area. These and other advantages will be illustrated further in the following description and the attached drawings.

In the following paragraphs, particular embodiments will be described in further detail by way of example with reference to the drawings. In the description, well-known components, methods, and/or processing techniques are omitted or briefly described. Furthermore, reference to various feature(s) of the embodiments is not to suggest that all embodiments must include the referenced feature(s).

FIGS. 1 through 5 provide views of a light emitting handle in accordance with an example embodiment. Other embodiments and variations also will be provided in the following description. Accordingly, this disclosure is not limited to the example embodiment illustrated in FIGS. 1 through 5.

Figure 1:
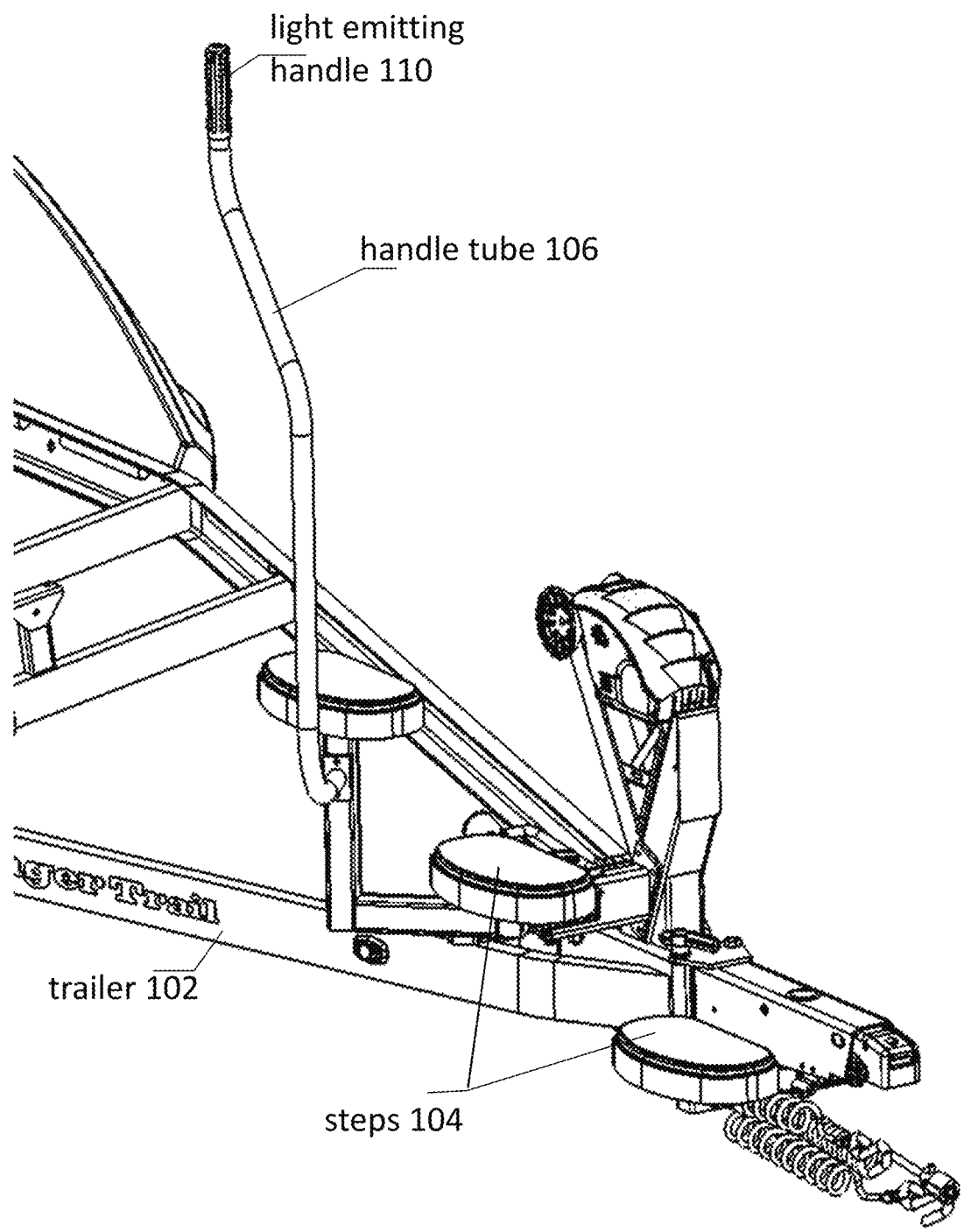
FIG. 1 illustrates a partial top perspective view of a boat trailer with a light emitting handle in accordance with an example embodiment of the disclosure.

Referring now to FIG. 1, a boat trailer 102 is illustrated. The boat trailer 102 includes boat trailer steps 104 attached to a front portion of the trailer 102. Extending generally vertically upward from the trailer steps 104 is a handle tube 106. At its top portion, the handle tube 106 has a cylindrical shape. However, in other embodiments, the handle tube 106 may have other shapes or may be attached to other portions of the boat trailer. Also at the top portion of the handle tube 106 is a light emitting handle 110. The light emitting handle 110 can slide on and off of the top portion of the handle tube 106. The handle tube 106 may be secured on the handle tube 106 by a friction fit, by one or more set screws, or with an adhesive. The light emitting handle 110 provides an enhanced gripping surface for a person gripping handle tube 106. The light emitting handle 110 can be made from any of a variety of materials, including plastics, natural and synthetic rubbers, and composites. The light emitting handle 110 also includes at least one light source to provide illumination to the area around the handle tube 106 and the trailer steps 104.

Figures 2, 3:
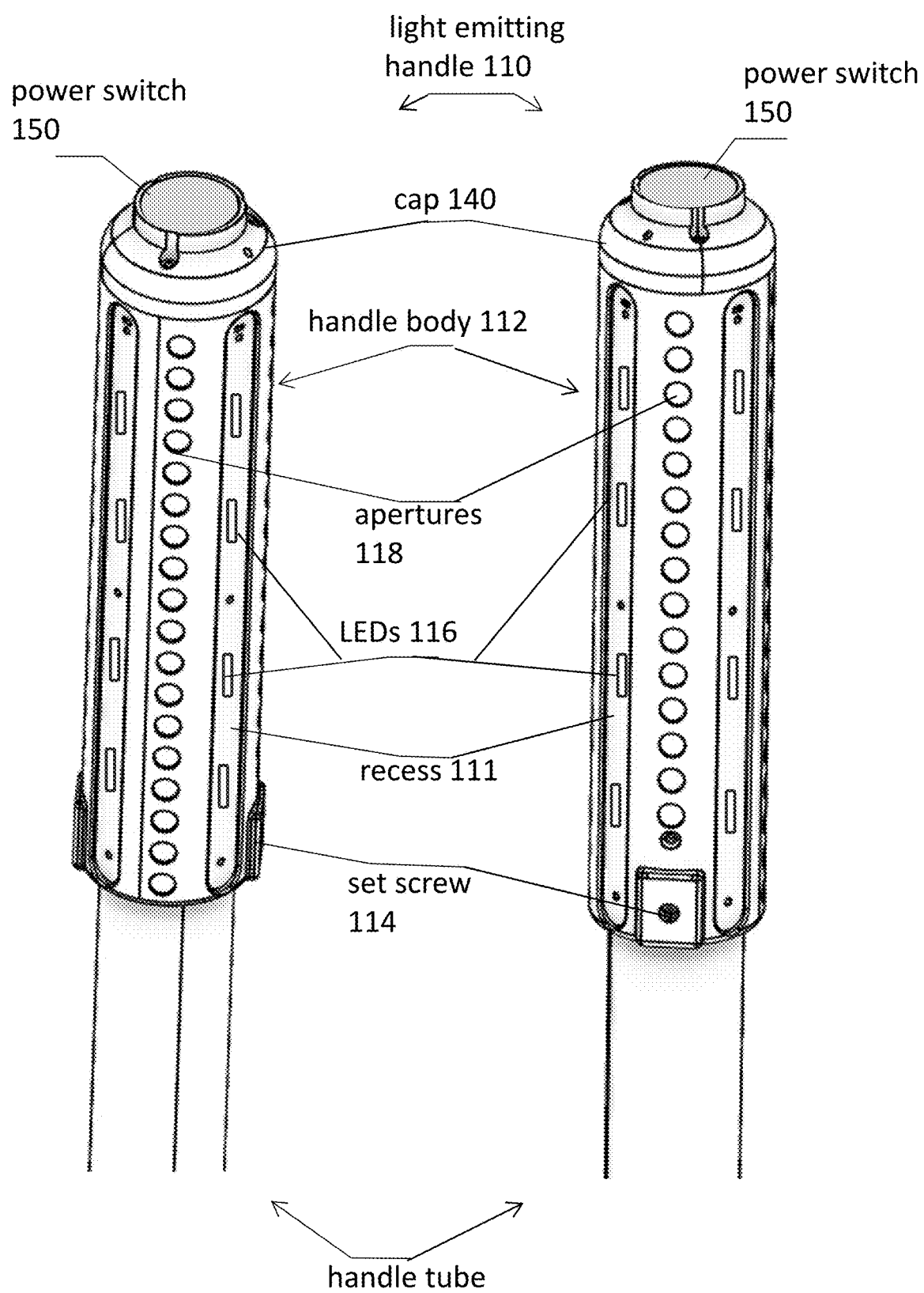
FIG. 2 illustrates a side view of the light emitting handle in accordance with an example embodiment of the disclosure.
FIG. 3 illustrates a front view of the light emitting handle in accordance with an example embodiment of the disclosure.

Referring now to FIGS. 2 through 5, the light emitting handle 110 is illustrated in greater detail. The exterior of the light emitting handle 110 is shown in the side view of FIG. 2 and the front view of FIG. 3. The light emitting handle 110 includes a handle body 112 that slides onto the handle tube 106. In the example of FIGS. 2 and 3, the light emitting handle 110 includes a pair of set screws 114 on opposite sides at a bottom portion of the light emitting handle 110. The set screws can be tightened to secure the light emitting handle 110 to the handle tube 106. Alternatively or in combination with one or more set screws, the light emitting handle 110 also can be secured by a friction fit with the handle tube 106 or with an adhesive.

The exterior surface of the handle body 112 includes one or more light sources to provide illumination in the ambient area. The example light emitting handle 110 of FIGS. 1 through 5 employs multiple arrays of light emitting diodes 116 positioned around the exterior surface of the handle body 112. The example light emitting handle 110 includes four arrays of four LEDs 116, wherein each array is spaced 90 degrees apart around the exterior circumference of the handle body 112. Each array of four LEDs 116 is arranged longitudinally along the handle body 112 so that each array defines a long axis passing through the array that is parallel to a central longitudinal axis of the light emitting handle 110. Moreover, each array of LEDs 116 may be disposed in a recess 111 having a longitudinal axis that is parallel to the central longitudinal axis of the light emitting handle 110. Although not required, the recess may be advantageous wherein the LEDs 116 do not interfere with a person's grip on the exterior surface of the handle body 112. In alternate embodiments, the light sources can be arranged in other patterns and with fewer or more light sources on the exterior surface of the handle body 112. Additionally, in other embodiments alternate types of light sources may be used instead of LEDs, such as organic LEDs or incandescent light sources.

The light emitting handle 110 also includes a power switch 150 which is used to turn on and off the one or more light sources. As will be described further below, the power switch 150 controls the flow of power from one or more batteries to the one or more light sources. In the example of light emitting handle 110, the power switch 150 is located on a cap 140 located at the top of the light emitting handle 110. However, in other embodiments, the power switch may be located at other positions, such as at various points along the outer circumference of the handle body 112.

Optionally, the exterior surface of the handle body 112 also may include one or more features that further enhance the ability of a person to grip the light emitting handle 110. In the example illustrated in FIGS. 2 and 3, the exterior surface of the handle body 112 includes a plurality of circular apertures 118 that can enhance the ability of a person to grip the light emitting handle. In alternate embodiments, other types of grip-enhancing features may be formed on the exterior surface of the handle body 112, such as protrusions or ribs.

Figure 4:
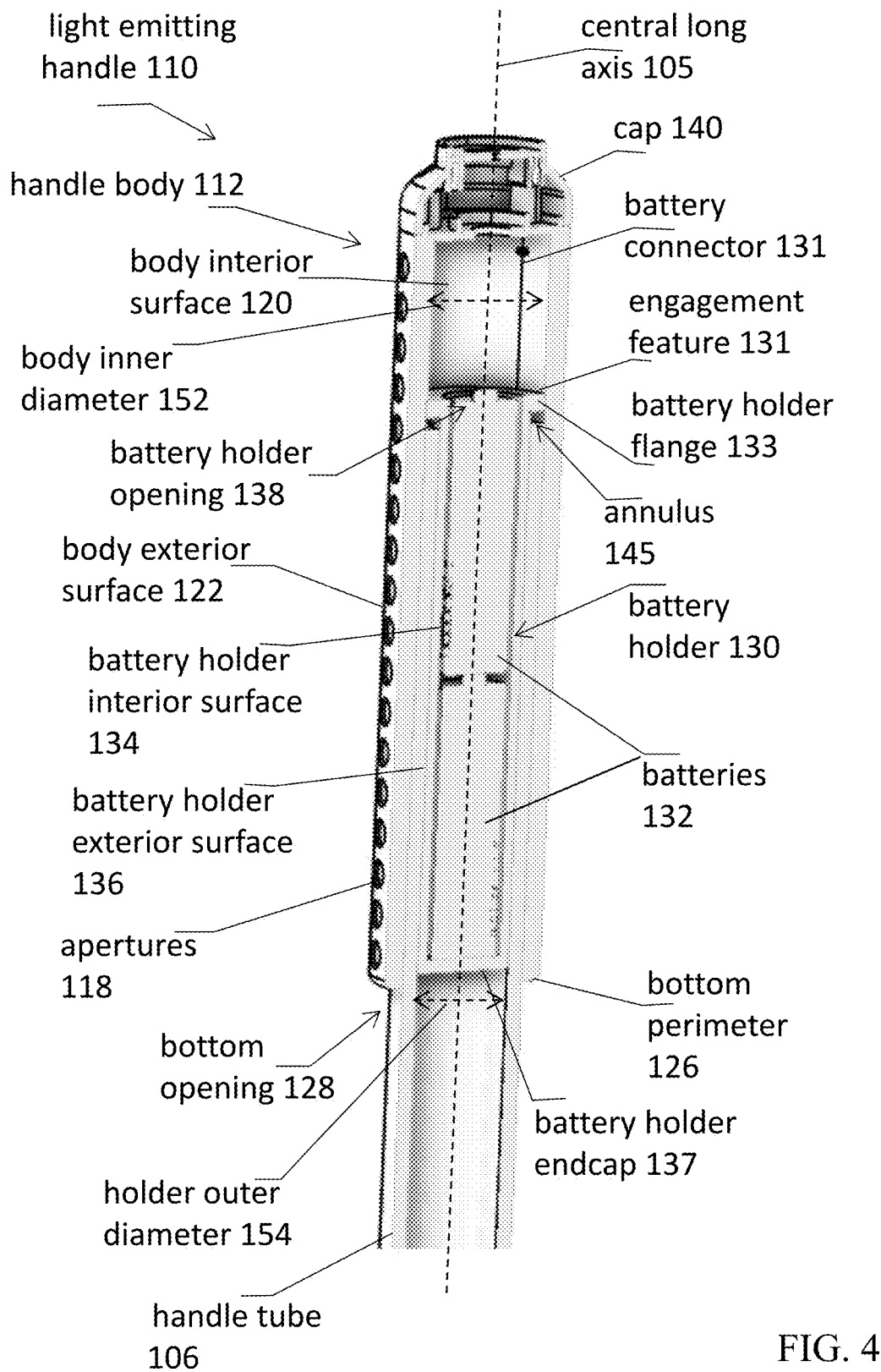
FIG. 4 illustrates a cross-sectional view of the light emitting handle in accordance with an example embodiment of the disclosure.
Figure 5:
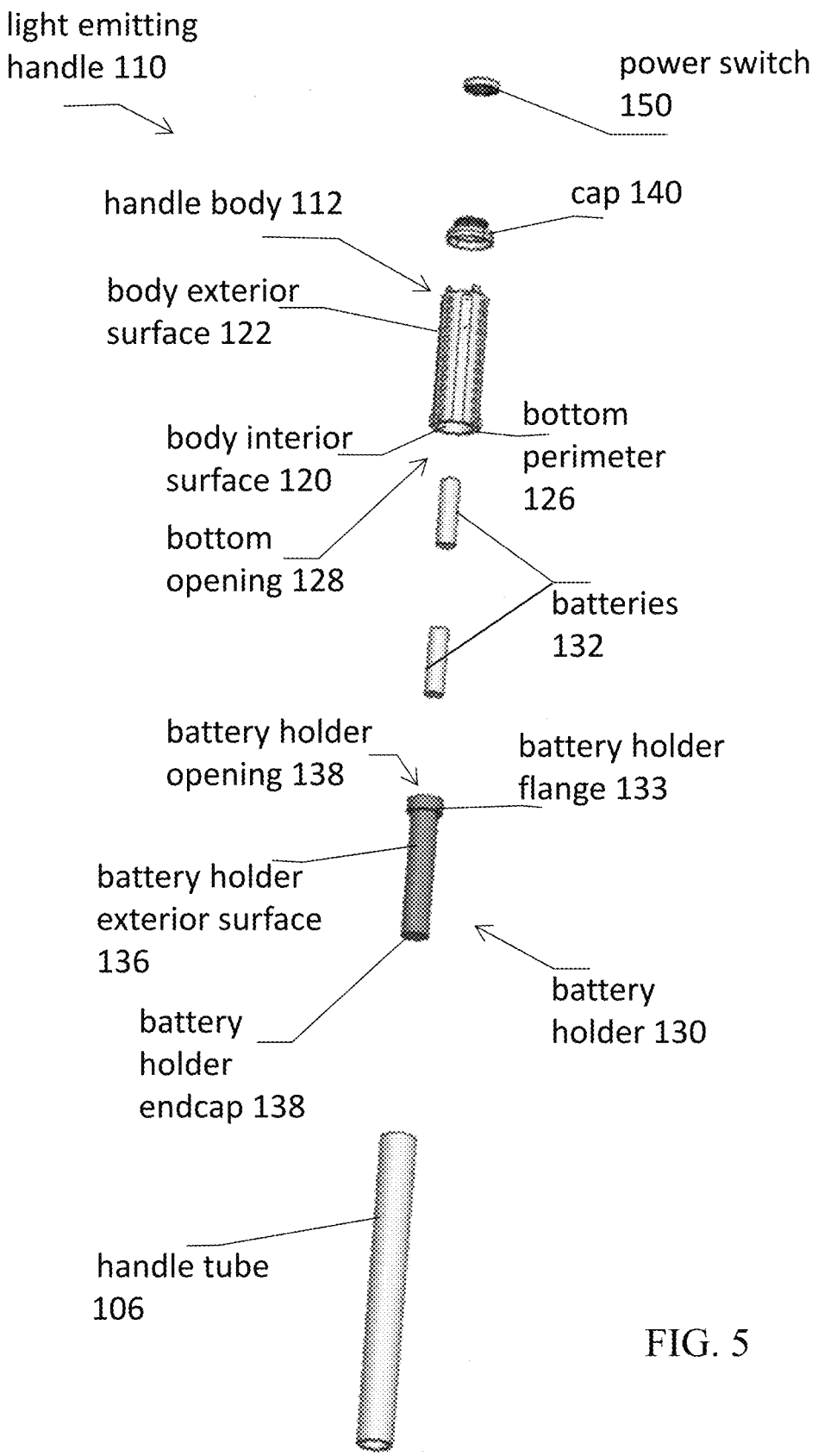
FIG. 5 illustrates an exploded view of the light emitting handle in accordance with an example embodiment of the disclosure.

Referring now to FIGS. 4 and 5, the light emitting handle 110 will be described in further detail. FIG. 4 provides a view taken along a longitudinal cross-section of the light emitting handle 110. FIG. 5 provides an exploded view of the components of the light emitting handle 110.

As illustrated in FIG. 4, within the handle body 112 is a battery holder 130 that contains one or more batteries 132 for powering the one or more light sources of the handle body 112. FIG. 4 illustrates the central longitudinal axis 105 of the handle body 112. While not required, in the example of FIG. 4, the battery holder 130 is coaxial with the handle body 112 such that a central longitudinal axis of the battery holder 130 coincides with the central longitudinal axis 105 of the handle body 112. The position of the battery holder 130 within the handle body 112 facilitates sliding light emitting handle 110 on and off of the handle tube 106.

The handle body 112 comprises a body exterior surface 122 and a body interior surface 120, both of which have a generally cylindrical shape in the example of FIGS. 2 through 5. A top end of the handle body 112 is closed with the cap 140. At the bottom end of the handle body 112, the body exterior surface 122 and the body interior surface 120 are joined by a bottom perimeter 126. The bottom end of the handle body 112 also comprises a bottom opening 128 defined by the body interior surface 120. The bottom opening 128 receives the handle tube as the light emitting handle 110 slides onto the handle tube 106.

The battery holder 130 comprises a battery holder exterior surface 136 and a battery holder interior surface 134, both of which have a generally cylindrical shape in the example of FIGS. 2 through 5. A bottom end of the battery holder 130 is closed by a battery holder endcap 137. A top end of the battery holder 130 includes a battery holder opening 138 through which one or more batteries 132 pass to be placed within or be removed from the battery holder 130. At or proximate to the top end of the battery holder 130 is located a battery holder flange 133. The battery holder flange 133 extends radially outward from the battery holder exterior surface 136. The battery holder flange 133 may secure the battery holder 130 within the handle body 112 by engaging one or more engagement features 131 on the body interior surface 120. The one or more engagement features 131 engaged by the battery holder flange 133 may be a protrusion, a recess, a ledge, or a detent, as examples. When the one or more batteries 132 require replacement, the battery holder flange 133 may be disengaged from the engagement feature 131 by pulling the battery holder 130 from the handle body 112. After replacing the batteries 132, the battery holder 130 may be inserted into the handle body 112 until the battery holder flange 133 engages the one or more engagement features 131

As referenced previously, actuating the power switch 150 on the light emitting handle 110 powers the light sources of the light emitting handle 110 on or off. The power switch 150 is coupled to a battery connector 131 disposed within the light emitting handle 110. As illustrated in FIG. 4, the battery connector 131 may be located along the body interior surface 120. The battery connector 131 is electrically coupled to the one or more batteries 132 and to the one or more light sources (LEDs) 116. When the power switch 150 is actuated to the on position, the battery connector 131 supplies power from the one or more batteries 132 to the one or more light sources (LEDs) 116.

As referenced previously, the handle body 112 and the battery holder 130 are configured to facilitate installation and removal of the light emitting handle with respect to a handle tube 106. The handle body has a body inner diameter 152 that is defined as the shortest distance between two opposing points on the body interior surface 120. Similarly, the battery holder 130 has a holder outer diameter 154 that is defined as the shortest distance between two opposing points on the battery holder exterior surface 136. The holder outer diameter 154 is smaller than the body inner diameter 152 such that an annulus 145 is disposed between the battery holder exterior surface 136 and the body interior surface 120. The annulus 145 is arranged to receive the handle tube 106, thereby allowing the light emitting handle 110 to easily be installed on and removed from the handle tube 106.

In the example of FIGS. 2 through 5, the handle body 112 and the battery holder 130 have a generally cylindrical shape such that they have a generally circular cross-sectional shape when a cross section of the light emitting handle 110 is taken perpendicular to the central longitudinal axis 105. However, the light emitting handle 110 is not limited to cylindrical shapes. In other embodiments, handle tubes may have facets that result in a cross section of the handle tube having a square, pentagonal, or hexagonal cross-sectional shape, as examples, when the cross section is taken perpendicular to a longitudinal axis of the handle tube. To accommodate handle tubes having these other shapes, the handle body 112 and the battery holder 130 may be similarly faceted so that they have a cross-sectional shape that is square, pentagonal, or hexagonal, as examples, when the cross section is taken perpendicular to a longitudinal axis of the light emitting handle. Accordingly, when the handle body 112 and the battery holder 130 are described as having a tubular shape, the tubular shape encompasses a cylindrical shape as well as other tubular shapes such as the aforementioned faceted shapes.

For any figure shown and described herein, one or more of the components may be omitted, added, repeated, and/or substituted. Additionally, it should be understood that in certain cases components can be combined or can be separated into subcomponents. Accordingly, embodiments shown in a particular figure should not be considered limited to the specific arrangements of components shown in such figure. Further, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure.

With respect to the example methods described herein, it should be understood that in alternate embodiments, certain operations of the methods may be performed in a different order, may be performed in parallel, or may be omitted. Moreover, in alternate embodiments additional steps may be added to the example methods described herein. Accordingly, the example methods provided herein should be viewed as illustrative and not limiting of the disclosure.

Terms such as "first", "second", "top", "bottom", "side", "distal", "proximal", and "within" are used merely to distinguish one component (or part of a component or state of a component) from another. Such terms are not meant to denote a preference or a particular orientation, and are not meant to limit the embodiments described herein. In the example embodiments described herein, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The terms "a," "an," and "the" are intended to include plural alternatives, e.g., at least one. The terms "including", "with", and "having", as used herein, are defined as comprising (i.e., open language), unless specified otherwise.

Although embodiments described herein are made with reference to example embodiments, it should be appreciated by those skilled in the art that various modifications are well within the scope of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A light emitting handle comprising:
    a handle body having a tubular shape, the handle body comprising:
    a body interior surface,
    a body exterior surface comprising one or more light emitting sources,
    a bottom perimeter joining the body interior surface and the body exterior surface at a bottom of the handle body,
    a bottom opening defined by the body interior surface at the bottom of the handle body,
    a handle body cap enclosing a top of the handle body, and
    a power switch for providing power to the one or more light emitting sources;
    a battery holder having a tubular shape that fits within the handle body, the battery holder comprising:
    a battery holder interior surface,
    a battery holder exterior surface,
    a battery holder endcap enclosing a bottom of the battery holder,
    a top opening defined by the battery holder interior surface, and
    a battery holder flange extending radially outward from the battery holder exterior surface proximate the top opening;
    wherein the body interior surface and the battery holder exterior surface define an annulus for receiving a handle tube.

2. The light emitting handle of claim 1, wherein the power switch connects a battery connector to the one or more light emitting sources.

3. The light emitting handle of claim 1, wherein the one or more light emitting sources comprises an array of light emitting sources disposed along a length of the body exterior surface.

4. The light emitting handle of claim 3, wherein the array of light emitting sources are disposed in a recess on the body exterior surface.

5. The light emitting handle of claim 4, wherein the array of light emitting sources are light emitting diodes.

6. The light emitting handle of claim 1, wherein the one or more light emitting sources comprises a first array of light emitting sources disposed along a first length of the body exterior surface and a second array of light emitting sources disposed along a second length of the body exterior surface.

7. The light emitting handle of claim 6, wherein the first array of light emitting sources are disposed in a first recess on the body exterior surface and the second array of light emitting sources are disposed in a second recess on the body exterior surface.

8. The light emitting handle of claim 7, wherein first array of light emitting sources and the second array of light emitting sources are light emitting diodes.

9. The light emitting handle of claim 1, wherein the power switch is disposed on the handle body cap.

10. The light emitting handle of claim 1, wherein the handle body and the battery holder have a common central longitudinal axis.

11. The light emitting handle of claim 1, wherein the handle body and the battery holder each have a circular cross-sectional shape.

12. The light emitting handle of claim 1, wherein the handle body and the battery holder each have a square cross-sectional shape.

13. The light emitting handle of claim 1, wherein the battery holder flange engages an engagement feature on the body interior surface.

* * * * *

UNITED STATES PATENT AND TRADEMARK OFFICE
CERTIFICATE OF CORRECTION

| | | |
|---|---|---|
| PATENT NO. | : 12,351,102 B1 | Page 1 of 1 |
| APPLICATION NO. | : 18/916914 | |
| DATED | : July 8, 2025 | |
| INVENTOR(S) | : Huddleston | |

It is certified that error appears in the above-identified patent and that said Letters Patent is hereby corrected as shown below:

On the Title Page

Item (73) Assignee, Please change "Bass Pro Intellectual Property, L.L.C." to --White River Marine Group, LLC. Springfield, MO (US)--.

Signed and Sealed this
Sixteenth Day of September, 2025

Coke Morgan Stewart
*Acting Director of the United States Patent and Trademark Office*